No. 845,785. PATENTED MAR. 5, 1907.
A. B. HENDRYX.
BIRD CAGE.
APPLICATION FILED NOV. 12, 1906.
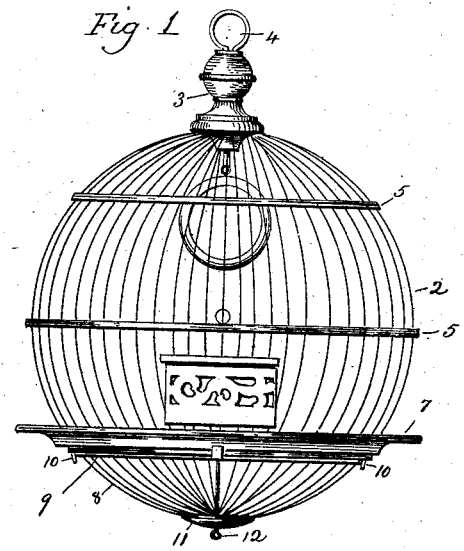
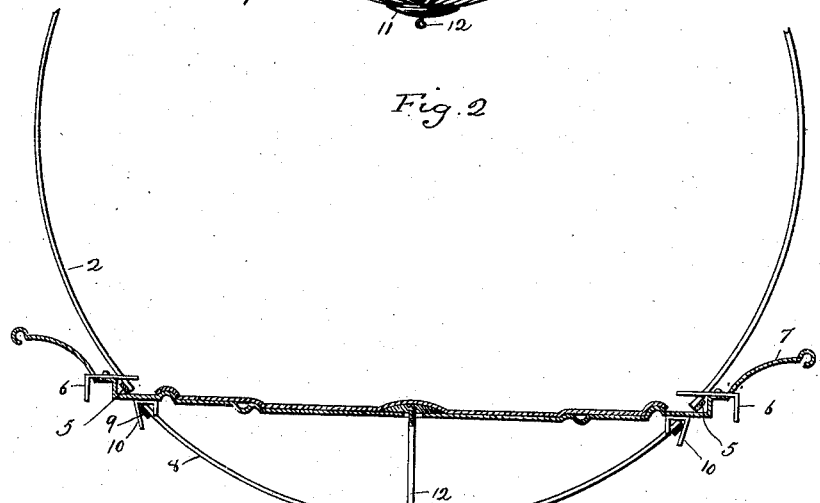
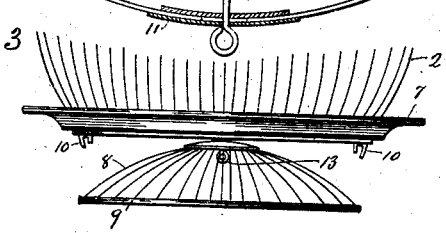
THE NORRIS PETERS CO., WASHINGTON, D. C.

UNITED STATES PATENT OFFICE.

ANDREW B. HENDRYX, OF NEW HAVEN, CONNECTICUT, ASSIGNOR TO THE ANDREW B. HENDRYX CO., OF NEW HAVEN, CONNECTICUT, A CORPORATION.

BIRD-CAGE.

No. 845,785.   Specification of Letters Patent.   Patented March 5, 1907.

Application filed November 12, 1906. Serial No. 343,020.

*To all whom it may concern:*

Be it known that I, ANDREW B. HENDRYX, a citizen of the United States, residing at New Haven, in the county of New Haven and State of Connecticut, have invented a new and useful Improvement in Bird-Cages; and I do hereby declare the following, when taken in connection with the accompanying drawings and the letters of reference marked thereon, to be a full, clear, and exact description of the same, and which said drawings constitute part of this specification, and represent, in—

Figure 1, a side view of a bird-cage constructed in accordance with my invention, showing the base as arranged for a hanging cage; Fig. 2, a broken transverse sectional view, on an enlarged scale, of the lower part of the same; Fig. 3, a side view of the lower part of the cage, showing the base reversed from that of the preceding figures.

This invention relates to an improvement in bird-cages, particularly such as are formed from wire and which comprise a cage proper and a pan to which the cage proper is attached. As usually constructed these cages are provided with a foot or base on which they may stand; but in the majority of cases the cages are suspended from the top.

The object of this invention is to provide a cage with a foot or base which may in general appearance appear to be a continuation of the body or which may be inverted and form a supporting-base therefor, and the invention consists in the construction hereinafter described and particularly recited in the claims.

As shown in the drawings, the cage proper consists of a body 2, preferably spherical, the wires being bowed outward from the lower edge and meeting at the center in the usual head 3, which has a suspending-eye 4. As in the usual construction of cages, the wires are separated and held in proper alinement by annular strips 5, more or less in number, the lower strip entering a pan 7 to which it is connected by sliding latches 6.

In connection with a cage thus formed as usual, except as to design, I employ a base 8. This base is preferably spherical and has an annular ring 9, which sets into sockets 10, provided in the under side of the pan 7, or into suitable grooves formed therein. The ring 9 corresponds substantially to the lower strip of the cage, so as to complete the spherical form of the cage. The wires forming this base are united to a plate 11, through which a screw 12 passes into engagement with the bottom of the pan 7.

A cage thus constructed and assembled may be suspended in the usual way; but if it is desired to stand the cage upon a table or other article the screw 12 will be removed, disengaging the base from the pan, and the base inverted, as shown in Fig. 3 of the drawings, and the plate 11 attached to the under face of the pan 7 by a short screw 13, thus providing a flat bottom base on which the cage may rest.

I claim—

1. In a bird-cage, the combination with a cage proper, a pan to which the cage is attached, combined with a spherical wire base formed with an annular ring for engagement with said pan, and means for detachably connecting the base with the pan, substantially as described.

2. The herein-described bird-cage comprising a spherical cage-body, a pan to which the body is attached, said pan formed on its under face with downwardly-opening sockets, combined with a spherical wire base having an annular ring adapted to enter said sockets, and means for detachably securing the base to the pan, substantially as described.

In testimony whereof I have signed this specification in the presence of two subscribing witnesses.

ANDREW B. HENDRYX.

Witnesses:
T. B. OLIVER,
A. B. ALLING.